(12) United States Patent
Hanashima

(10) Patent No.: US 12,202,417 B2
(45) Date of Patent: Jan. 21, 2025

(54) GROMMET

(71) Applicant: YAZAKI CORPORATION, Tokyo (JP)

(72) Inventor: Manabu Hanashima, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 74 days.

(21) Appl. No.: 18/189,370

(22) Filed: Mar. 24, 2023

(65) Prior Publication Data

US 2023/0311789 A1    Oct. 5, 2023

(30) Foreign Application Priority Data

Apr. 4, 2022   (JP) .................................. 2022-062326

(51) Int. Cl.
*B60R 16/02*      (2006.01)
*H02G 3/22*       (2006.01)

(52) U.S. Cl.
CPC ........... *B60R 16/0222* (2013.01); *H02G 3/22* (2013.01)

(58) Field of Classification Search
CPC ..................... H01B 17/583; H01B 17/586; B60R 16/0222; B60R 16/0215; B60R 16/0207; H02G 15/013; H02G 3/22
USPC .............................................. 16/2.1, 2.2, 2.5
See application file for complete search history.

(56) References Cited

U.S. PATENT DOCUMENTS

| | | | | |
|---|---|---|---|---|
| 6,376,777 B1 * | 4/2002 | Ito | ........................... | H02G 3/088 174/152 G |
| 6,815,615 B1 * | 11/2004 | Haulotte | ............... | H02G 15/013 174/152 G |
| 6,844,497 B2 * | 1/2005 | Frantz | ................. | B60R 16/0207 296/146.7 |
| 7,408,115 B2 * | 8/2008 | Doring | ................... | H02G 11/00 174/72 A |
| 7,943,854 B1 * | 5/2011 | Lipp | ...................... | H02G 11/00 174/152 G |
| 8,203,079 B2 * | 6/2012 | Ujita | ................... | B60R 16/0222 174/152 G |
| 8,378,238 B2 * | 2/2013 | Brunner | .............. | B60R 16/0222 174/152 G |
| 8,544,147 B2 * | 10/2013 | Paku | ................... | B60R 16/0222 16/2.2 |
| 8,783,762 B2 * | 7/2014 | Gaemmerler | .......... | H02G 11/00 296/208 |

(Continued)

FOREIGN PATENT DOCUMENTS

JP          3664228 B2 *  6/2005  ......... B60R 16/0222
JP       2011-172386 A    9/2011

(Continued)

*Primary Examiner* — Jeffrey O'Brien
(74) *Attorney, Agent, or Firm* — Sughrue Mion, PLLC

(57) ABSTRACT

A grommet includes: a small-diameter cylinder portion through which a wire harness is inserted; a large-diameter cylinder portion including a harness draw port provided at a tip of the small-diameter cylinder portion and configured to draw the wire harness to an inner side of a panel, and an annular attachment recess fitted into a mounting hole of the panel; and a harness regulator protruding inward from a peripheral edge of the harness draw port of the large-diameter cylinder portion and configured to regulate a routing path of the wire harness by directing the routing path to either a left side or a right side.

4 Claims, 3 Drawing Sheets

(56) References Cited

U.S. PATENT DOCUMENTS

| | | | |
|---|---|---|---|
| 8,925,147 B2* | 1/2015 | Furuta | B60R 16/0222 |
| | | | 174/152 G |
| 9,083,168 B2* | 7/2015 | Kamenoue | B60R 16/0222 |
| 9,896,042 B2* | 2/2018 | Suzuki | B60R 16/0222 |
| 10,569,725 B2* | 2/2020 | Ogawa | B60R 16/0222 |
| 2013/0061424 A1* | 3/2013 | Lee | E02F 9/163 |
| | | | 16/2.2 |
| 2018/0079374 A1* | 3/2018 | Nakai | B60R 16/0222 |
| 2022/0090707 A1* | 3/2022 | Sbongk | F16J 15/024 |
| 2023/0135801 A1* | 5/2023 | Ando | H01B 17/583 |
| | | | 174/668 |

FOREIGN PATENT DOCUMENTS

| | | | | |
|---|---|---|---|---|
| JP | 2016054587 A | * | 4/2016 | |
| JP | 2021166449 A | * | 10/2021 | |
| WO | WO-2010073856 A1 | * | 7/2010 | B60R 16/0222 |

* cited by examiner

GROMMET

CROSS-REFERENCE TO RELATED APPLICATIONS

The present application is based on, and claims priority from the prior Japanese Patent Applications No. 2022-062326, filed on Apr. 4, 2022, the entire contents of which are incorporated herein by reference.

TECHNICAL FIELD

The disclosure relates to a grommet attached to the door of an automobile.

BACKGROUND

JP 2011-172386 A discloses a wire harness routed between the body and the door of an automobile. The wire harness supplies power to a plurality of electrical components provided in various parts of the vehicle, or transmits electrical signals for the plurality of electrical components. A grommet is attached to the door panel to insert and protect the above wire harness.

SUMMARY

In the above grommet, a separate component regulates the routing path of the wire harness such that the wire harness drawn from the grommet into the door does not interfere with peripheral components, thereby resulting in an increase in cost because the number of components and the number of man-hours required for installation increase due to the separate component.

The disclosure is directed to a grommet that is capable of reducing the number of components and the number of man-hours required for attachment, and that is capable of easily and inexpensively regulating the routing path of a wire harness using a single component.

A grommet in accordance with some embodiments includes: a small-diameter cylinder portion through which a wire harness is inserted; a large-diameter cylinder portion including a harness draw port provided at a tip of the small-diameter cylinder portion and configured to draw the wire harness to an inner side of a panel, and an annular attachment recess fitted into a mounting hole of the panel; and a harness regulator protruding inward from a peripheral edge of the harness draw port of the large-diameter cylinder portion and configured to regulate a routing path of the wire harness by directing the routing path to either a left side or a right side.

According to the above configuration, it is possible to provide a grommet that is capable of reducing the number of components and the number of man-hours required for attachment, and that is capable of easily and inexpensively regulating the routing path of a wire harness using a single component.

DETAILED DESCRIPTION

A grommet according to embodiments of the present invention will be described in detail hereinafter with reference to the accompanying drawings.

Figure 1:
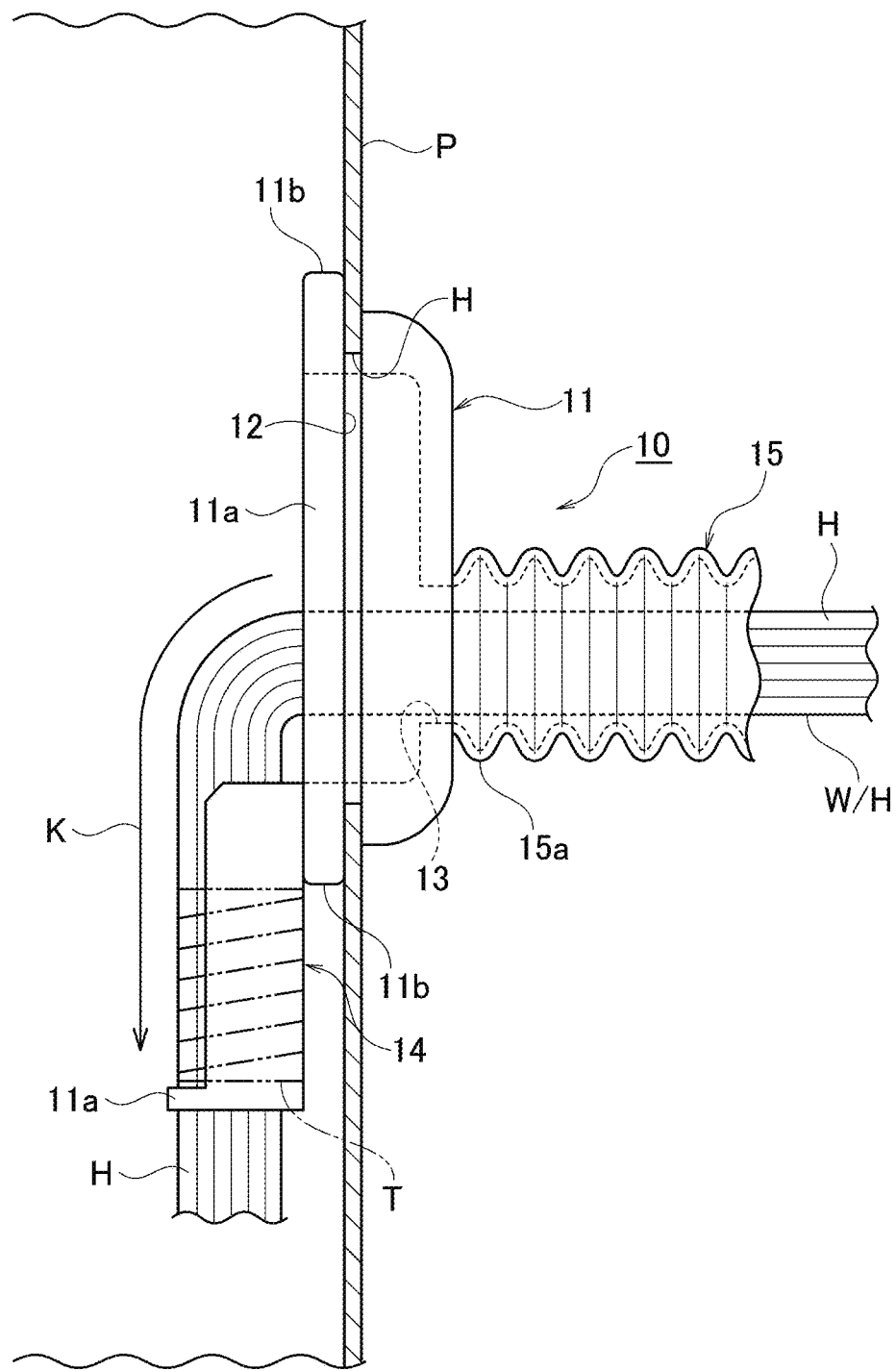
FIG. 1 is a side view illustrating an example of a state in which a grommet according to an embodiment of the present invention is attached to a door panel.
Figure 2A:
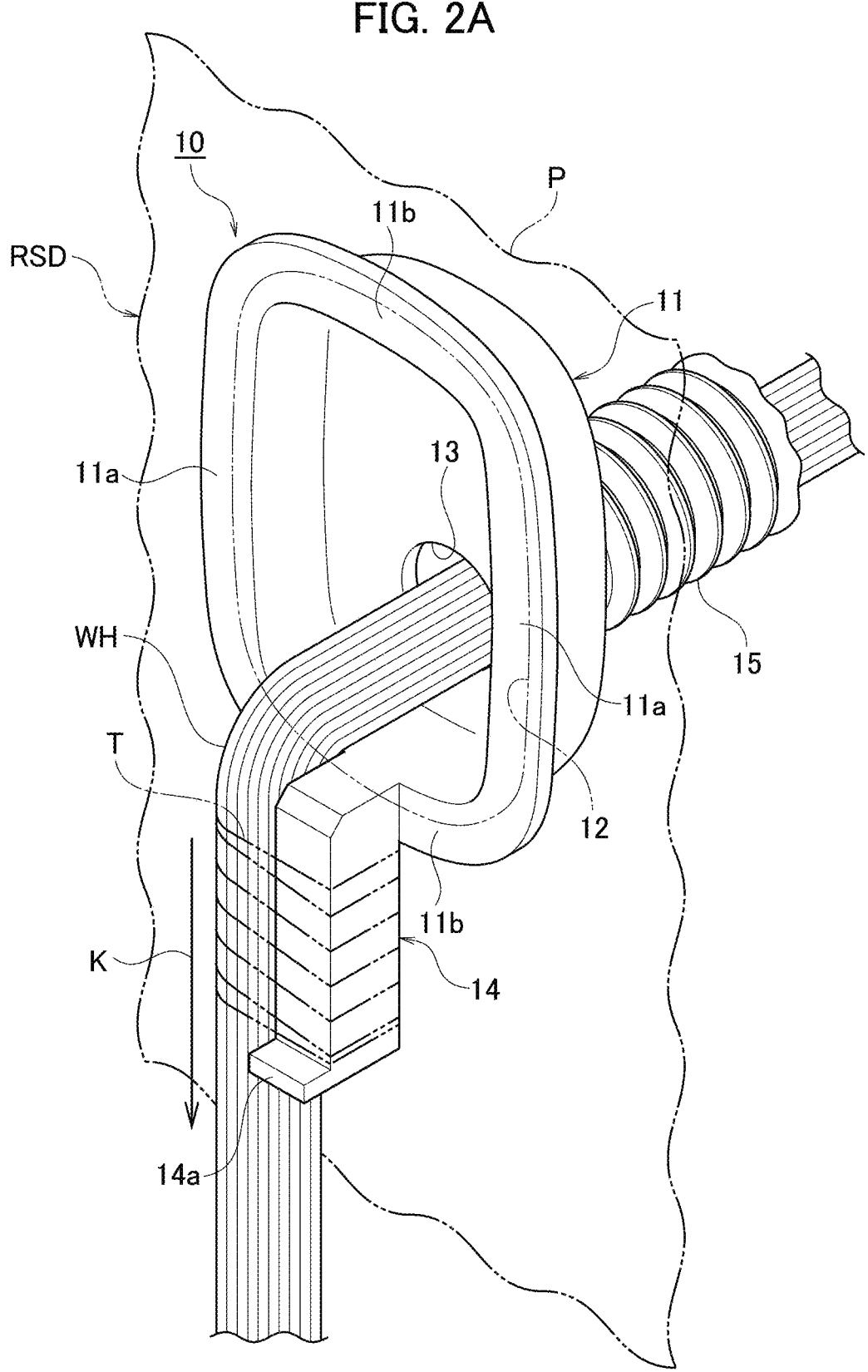
FIG. 2A is a perspective view of the grommet mounted on the door panel of a side door at the driver-seat side as viewed from the inner side of the door.
Figure 2B:
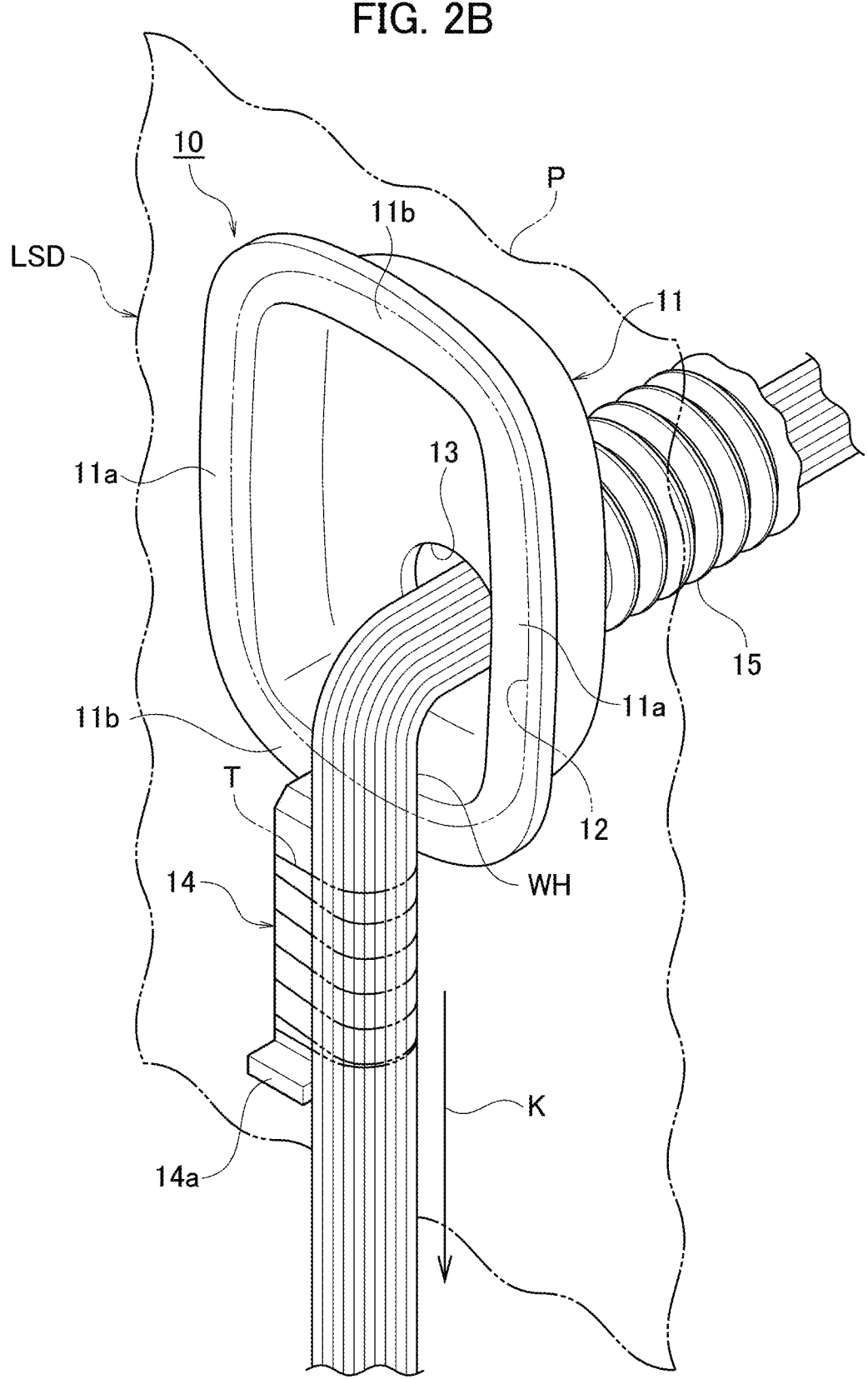
FIG. 2B is a perspective view of the grommet mounted on the door panel of a side door at the passenger-seat side as viewed from the inner side of the door.

FIG. 1 is a side view illustrating an example of a state in which a grommet 10 according to an embodiment of the present invention is attached to a door panel P. FIG. 2A is a perspective view of the grommet 10 mounted on the door panel P of a side door at the driver-seat side as viewed from the inner side of the door. FIG. 2B is a perspective view of the grommet 10 mounted on the door panel P of a side door at the passenger-seat side as viewed from the inner side of the door.

As illustrated in FIG. 1, the grommet 10 is attached to a wire harness W/H configured of a bundle of electric wires in which a plurality of electric wires H are bundled together. The grommet 10 is integrally molded as a single body from an elastic material such as rubber or elastomer.

The grommet 10 includes a large-diameter cylinder portion 11 mounted on the door panel (panel) P, and a bellows-shaped small-diameter cylinder portion 15 through which the wire harness W/H is inserted. In front view, the large-diameter cylinder portion 11 is configured of an oblong-shaped cylinder having a pair of long-side sidewalls 11a and a pair of short-side sidewalls 11b. At the center of the outer circumference of the oblong-shaped cylinder of the large-diameter cylinder portion 11, an annular attachment recess 12 is provided, which is fitted into a mounting hole H formed in the door panel P. At a position near the short-side sidewall 11b at the lower side of the large-diameter cylinder portion 11, an eccentrically opened harness draw port 13 is provided, which draws the wire harness W/H to the inner side of the door panel P. A tip 15a of the small-diameter cylinder portion 15 is integrally formed at the rear end of the harness draw port 13.

A harness regulator 14 is integrally formed such that the harness regulator 14 protrudes vertically downward at the inner side, at the center of the short-side sidewall 11b (peripheral edge) at the lower side where the harness draw port 13 of the large-diameter cylinder portion 11 is provided. The harness regulator 14 regulates a routing path K of the wire harness W/H by directing the routing path K to either the left side or the right side. The harness regulator 14 is formed in the shape of a thick rectangular plate and also serves as a fixed piece with a tape positioning rib 14a at the tip, and regulates the routing path K of the wire harness W/H routed to the inner side of the door of the door panel P by directing the routing path K in the left-right direction. The wire harness W/H directed to either the left side or the right side is fixed to the harness regulator 14, which also serves as a fixed piece, by means of tape-winding using an adhesive tape T.

As illustrated in FIG. 1, FIG. 2A, and FIG. 2B, the harness regulator 14 is set to a shape and thickness comparable to the rigidity of the wire harness W/H because the grommet 10 is formed of a soft elastic material such as rubber or elastomer. The harness regulator 14 is provided in a protruding manner at the center of the short-side sidewall 11b at the lower side immediately below the harness draw port 13. This protrusion at the center allows the grommet 10, which is a single component, to be used both in the case where the door panel P illustrated in FIG. 2A is for the side door RSD at the driver-seat side and in the case where the door panel P illustrated in FIG. 2B is for the side door LSD at the passenger-seat side. In other words, the grommet can be used for the door RSD at the driver-seat side and the side door LSD at the passenger-seat side.

According to the grommet 10 of the embodiment described above, in a case where the door panel P is for the door RSD at the driver-seat side as illustrated in FIG. 2A, the wire harness W/H is directed and routed to the right side by the harness regulator 14, when viewed from the small-diameter cylinder portion 15 toward the large-diameter cylinder portion 11. The wire harness W/H directed to the right side is fixed to the harness regulator 14, which also serves as a fixed piece, by means of tape-winding using the adhesive tape T.

As illustrated in FIG. 2B, in a case where the door panel P is for the side door LSD at the passenger-seat side, the wire harness W/H is directed and routed to the left side by the harness regulator 14, when viewed from the small-diameter cylinder portion 15 toward the large-diameter cylinder portion 11. The wire harness W/H directed to the left side is fixed to the harness regulator 14, which also serves as a fixed piece, by means of tape-winding using the adhesive tape T.

As described above, since the grommet 10 is provided with the harness regulator 14 that regulates the routing path K of the wire harness W/H by directing the routing path K to either the left side or the right side, a separate component for routing is not required when the wire harness W/H is routed to the inner side of the door, thereby making it possible to reduce the number of components and the number of man-hours required for attachment. That is, it is possible to regulate the routing path K of the wire harness W/H easily and inexpensively with the grommet 10, which is a single component. Since the routing path K of the wire harness W/H is regulated in this way, it is possible to route the wire harness W/H easily and reliably, for example, by avoiding peripheral parts that may cause interference such as a door reinforcement provided at the inner side of a door.

In the above embodiment, the harness regulator 14 is formed in the shape of a thick rectangular plate; however, the present invention is not limited to this configuration. For example, the harness regulator 14 may be formed into a cylindrical shape with a large diameter. In the above embodiment, the harness regulator 14 is integrally formed so as to protrude from the short-side sidewall side of the large-diameter cylinder portion 11; however, the present invention is not limited to this configuration. For example, a grommet inner may be provided and the harness regulator 14 may be integrally provided therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A grommet comprising:
    a small-diameter cylinder portion through which a wire harness is inserted;
    a large-diameter cylinder portion comprising:
        two lateral sidewalls that are spaced apart from each other in a horizontal direction;
        a lower sidewall that connects together the two lateral sidewalls;
        a harness draw port provided at a tip of the small-diameter cylinder portion and configured to draw the wire harness to an inner side of a panel, and
        an annular attachment recess configured to be fitted into a mounting hole of the panel; and
    a harness regulator protruding inward and vertically downward from a center portion, in the horizontal direction, of the lower sidewall of the large-diameter cylinder portion and configured to regulate a routing path of the wire harness by directing the routing path to either a left side or a right side, wherein
    the harness regulator has a shape of a thick rectangular plate and also serves as a fixed piece having a tape positioning rib at a tip of the harness regulator, and
    the wire harness directed to either the left side or the right side is fixed to the harness regulator also serving as the fixed piece, by a tape-winding comprising an adhesive tape.

2. The grommet according to claim 1, wherein
    the panel is a door panel, and
    the routing path of the wire harness to the inner side of the door panel is directed in a left-right direction at the harness regulator.

3. The grommet according to claim 2, wherein the harness regulator directs and routes the wire harness to a right side when viewed from the small-diameter cylinder portion toward the large-diameter cylinder portion.

4. The grommet according to claim 2, wherein the harness regulator directs and routes the wire harness to a left side when viewed from the small-diameter cylinder portion toward the large-diameter cylinder portion.

* * * * *